United States Patent [19]

Kawamura et al.

[11] Patent Number: 5,194,685
[45] Date of Patent: Mar. 16, 1993

[54] KEYBOARD MUSICAL INSTRUMENT HAMMER MOVEMENT DETECTION APPARATUS

[75] Inventors: Kiyoshi Kawamura; Shigeru Muramatsu, both of Hamamatsu, Japan

[73] Assignee: Yamaha Corporation, Hamamatsu, Japan

[21] Appl. No.: 722,001

[22] Filed: Jun. 27, 1991

[30] Foreign Application Priority Data

Jun. 28, 1990 [JP] Japan .................................. 2-170591

[51] Int. Cl.$^5$ .................... G01H 1/34; G01H 3/00; G10F 1/02
[52] U.S. Cl. ........................... 84/670; 74/658; 74/687; 74/718; 74/236; 74/239; 74/323; 74/29
[58] Field of Search ................. 84/626, 644, 658, 670, 84/687, 718, 236, 239, 323, 324, 21, 29, 462

[56] References Cited

U.S. PATENT DOCUMENTS 4,593,592  6/1986  Stahnke .................... 84/21
4,736,662  1/9888  Yamamoto ............... 84/687
5,016,513  5/1991  Stahnke .................... 84/462

*Primary Examiner*—William M. Shoop, Jr.
*Assistant Examiner*—Helen Kim
*Attorney, Agent, or Firm*—Spensley Horn Jubas & Lubitz

[57] ABSTRACT

A hammer movement detection device for detecting the movement of a hammer which strikes strings provided for each key of a keyboard musical instrument. The hammer movement detection device radiates light onto a hammer shank which moves with the hammer and detects at least the displacement of the hammer shank based on the light reflected from the hammmer shank. The movement detection device may be attached to a shank rail which supports the hammer shank in a freely rotatable manner. The hammer movement detection device may be supported using a fixed member which is supported above the hammer shank and below the pin board which is connected to the frame which supports the strings which are struck by the hammer.

13 Claims, 7 Drawing Sheets

KEYBOARD MUSICAL INSTRUMENT HAMMER MOVEMENT DETECTION APPARATUS

BACKGROUND OF THE INVENTION

1. Field of the Invention

The present invention relates to a hammer movement detection apparatus for use in the detection of a performance state in a keyboard musical instrument such as an automatic piano or the like.

2. Prior Art

Conventionally, in keyboard musical instruments such as automatic pianos or the like, the detection of hammer operations was carried out in order for the purpose of the detection of a performance state, the recording of a performance state, or the control of the reproducing of a performance or the like. An example of the structure of a detecting mechanism for the detection of such hammer operations is shown in FIG. 7.

The detecting mechanism shown in FIG. 7 is applied to the actuation control of a key 2 of a grand piano 1 which is a keyboard type musical instrument. Herein, a pair of photointerruptors 5, 5 are provided within the swinging area of a hammer shank 4, to which a hammer 3 which strikes string 9 is attached, and above this shank, and a shutter 6 is attached to this hammer shank 4. This shutter 6 sequentially interrupts these photointerruptors 5, 5 based on the swinging of the hammer shank 4. The velocity of the hammer 3 is detected in accordance with the difference in period between each interrupting period in which the photointerruptors 5, 5 are sequentially interrupted, and the string striking velocity is estimated from the detected hammer velocity. Based on this string striking velocity, the point in time at which the string is struck and the striking strength are calculated, and thereby the operational state of hammer 3 is detected. The detection signal which is output from the photointerruptors 5, 5 which detect the operational state of hammer 3 in this manner, is supplied to a control circuit (not shown in the diagram) through the medium of optical fiber 7, and by means of this control circuit the above-mentioned string striking velocity and string striking strength are obtained. In this type of conventional technology the following problems occur.

(1) In order to insert the shutter 6 into the hammer shank 4 an attachment hole must be provided in this shank 4 in advance, and the operations involved in the attachment of the shutter 6 to the hammer shank 4 make the overall assembly more difficult.

(2) Furthermore, in the above-mentioned grand piano 1, in the case in which the action mechanism 8 which includes the hammer 3 and the hammer shank 4 and the like is to be adjusted, it is necessary to remove the mechanism 8 from the grand piano 1 each time such adjustment is to be made. However, a pin board 11 which is provided along frame 10 which supports strings 9 is positioned above the action mechanism 8, and the space between this pin board 11 and the action mechanism 8 is extremely narrow. In this type of positional relationship, when photointerruptors 5, 5 and optical fiber 7 are included in the upper part of the action mechanism 8, this serves to make the gap between this mechanism and the pin board 11 even more narrow. As a result, in the case in which the action mechanism 8 is inserted or removed, there is a danger that the mechanism will make contact with this pin board 11 and will thus be damaged.

As a means to solve these problems, the following methods have been considered. A method is possible in which the inserted position of the action mechanism 8 is lowered by a certain number of millimeters; a method is also possible in which the position of the attachment hole on the hammer shank 4 is moved a number of millimeters further from the hammer wood 12; and finally, a method is possible in which the mounting board 13 is made thinner by 0.5-1 millimeter. However, in the case in which these methods are adopted, the touch of the keys 2 is affected in small ways, and thus an effect is produced which is not desirable for musical instruments.

(3) In addition, in the above described action mechanism 8, the optical fibers 7 include wiring, so that a high degree of assembly accuracy is required, and thus the ease of the assembly is negatively affected, and by means of this an increase in the number of production processes is likely.

SUMMARY OF THE INVENTION

It is an object of the present invention to provide a hammer movement detection apparatus for keyboard instruments which is able to deal with the above-mentioned problems.

Accordingly this invention is provided with: an movement detection mechanism which detects operations, including at least the displacement of the hammer shank which is connected to the hammer of the keyboard musical instrument, based on the reflected light from the hammer shank; and a fixed member which is attached to the shank rail, which supports the hammer shank in a freely rotatable manner, and which supports the movement detection mechanism above the hammer shank and below the pin board which is connected to the frame which supports the strings which are struck by means of the hammer.

By means of the above structure it is possible to continuously detect the distance to the hammer shank in the movement detection mechanism by means of the light which is reflected from this hammer shank which moves together with the hammer, and by means of this the displacement of the hammer can be continuously detected.

Furthermore, the movement detection mechanism detects the displacement of the hammer by means of a distance detection movement which uses light, so that the movement detection mechanism itself becomes thin. In other words, it is possible to increase the mountability thereof by maintaining the gap between this mechanism and the other parts of the structure which are disposed in the vicinity of the hammer. As a result, when the hammer or the action mechanism parts which are provided with this hammer are inserted or removed, it is possible to eliminate the interference of other structural members. In addition, the displacement of the hammer is detected using light, so that it is possible to measure the hammer movement in terms of a continuous analog amount, and by means of this it is possible to detect even small changes, so that it is possible to increase the accuracy of detection.

Furthermore, it is possible to include the movement detection mechanism without carrying out a special process on the hammer shank, so that the accuracy of assembly increases and the ease of assembly increases and it is possible to reduce the number of steps involved in production.

DETAILED DESCRIPTION OF THE PREFERRED EMBODIMENTS

First Preferred Embodiment

Figure 1:
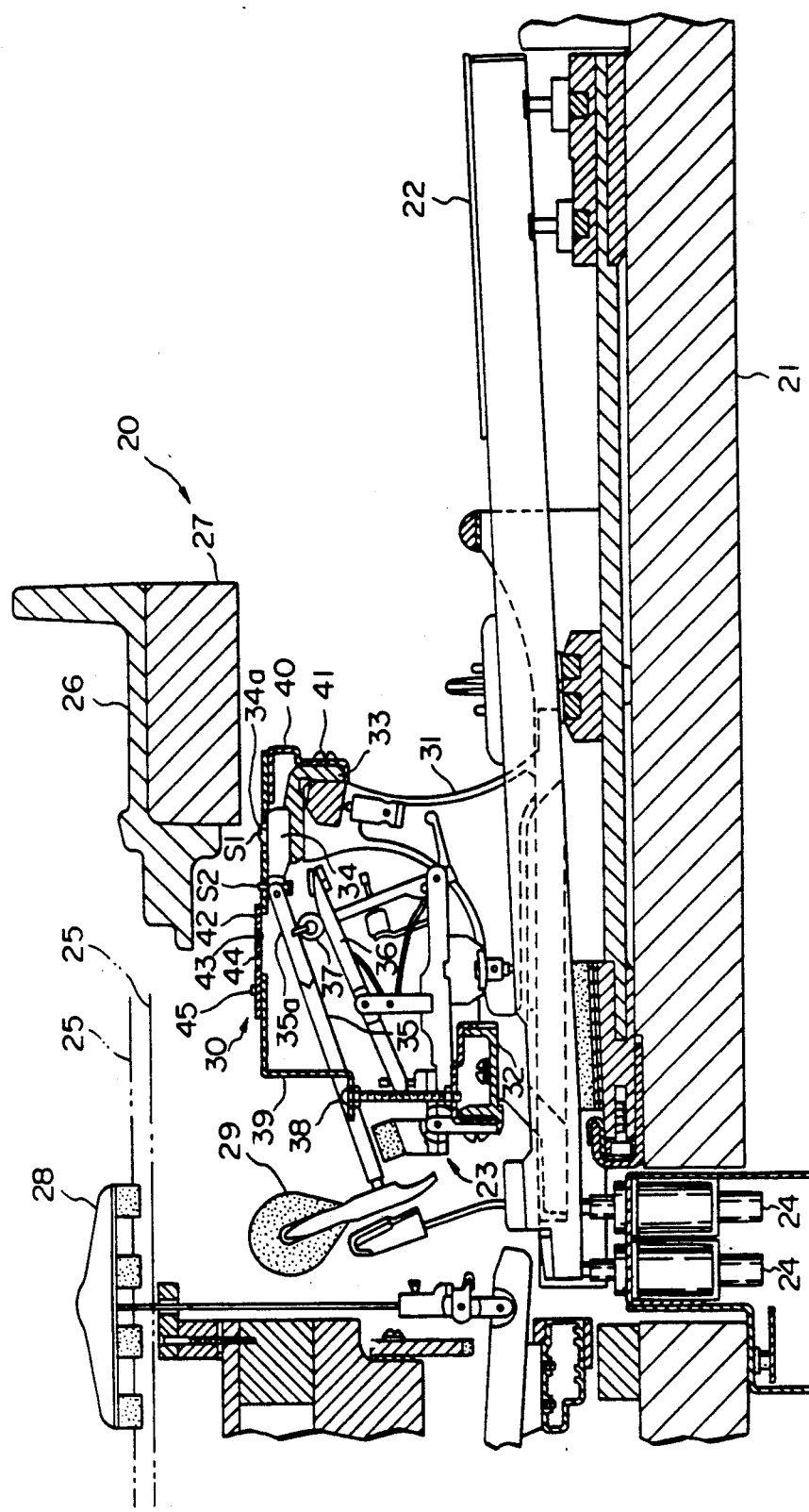
FIG. 1 is a vertical cross-sectional drawing showing the main parts of a grand piano to which a first embodiment in accordance with the present invention has been applied.
Figure 2:
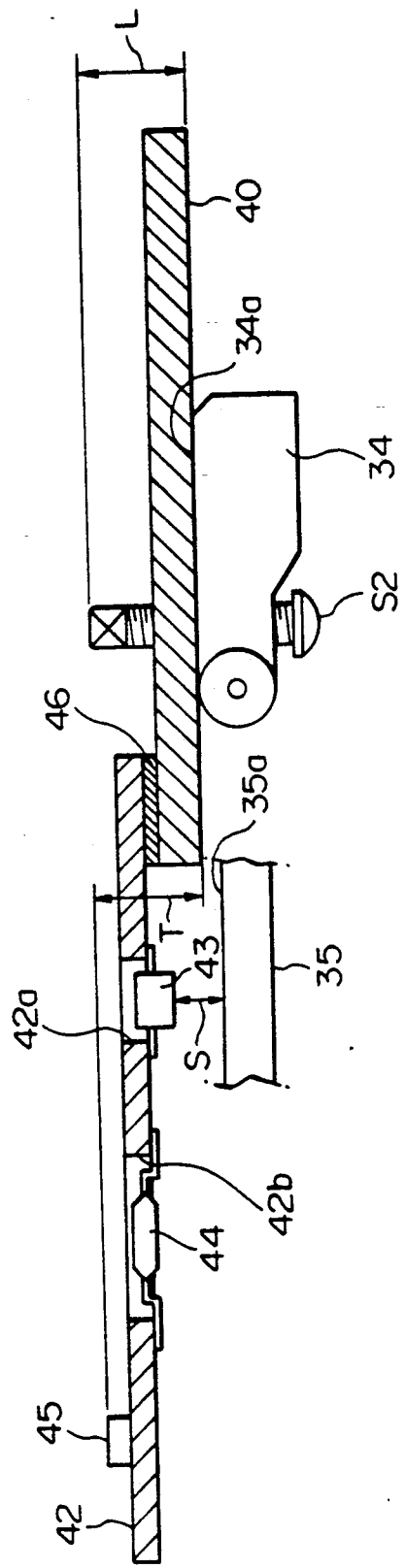
FIG. 2 is an enlarged vertical cross-sectional drawing of the main part shown in FIG. 1.

Hereinbelow, a first preferred embodiment of the present invention will be explained with reference to the diagrams. FIGS. 1 and 2 are vertical cross-sectional diagrams showing the main parts of a grand piano 20 to which a first preferred embodiment of the present invention has been applied. In FIG. 1 reference numeral 21 indicates a mounting board, and FIG. 2 indicates a key which is inserted freely swingably on the upper surface of this mounting board 21. A plurality of these keys 22 are provided; however in this diagram only one key is shown. Reference numeral 23 indicates an action mechanism which is disposed above the rear end part of key 22. Reference numeral 24 indicates solenoids which cause this key 22 to swing, and reference numeral 25 indicates a string which is disposed above the action mechanism 23. Reference numeral 26 indicates a frame which supports the strings 25. Reference numeral 27 indicates a pin board which is disposed on the lower surface of the frame 26. Reference numeral 28 indicates a damper which controls the vibration of string 25. Reference numeral 29 indicates a hammer which is swung by the action mechanism number 23 and strikes string 25. Reference numeral 30 indicates a hammer movement detection mechanism which detects the displacement of hammer 3.

A plurality of action brackets 31 are attached to the upper surface of the mounting board 21 with a fixed spacing along the disposed direction of keys 22. A support rail 32 is hung to the rear or the lower part of these action brackets 31; the action mechanism 23 is placed on this support rail 32. A shank rail 33 is hung above and to the front of the action brackets 31 and the hammer shank fringe 34 is affixed to this shank rail 33 by means of a hammer shank fringe screw S1. A hammer shank 35 is inserted freely rotatably into this hammer shank fringe 34 and a hammer 29 is affixed to the rear end of this shank 35. A repetition lever 36 which comprises action mechanism 23 is in contact with the lower surface of the vicinity of the rotational center of the hammer shank 35 through the medium of the hammer roller 37. A repetition regulating screw S2 which communicates the top and bottom of the hammer shank fringe 34 is provided in the connecting part of the hammer shank 35 and the hammer shank fringe 34. A damper 26, which is moved upward and downward and is thus in contact with and separated from string 25 as a result of the swinging movement of key 22 or the operation of a pedal which is not shown in the diagram, is disposed above string 25. A fixing bolt 38 is affixed in support rail 32 in an upward direction and a first fixing frame 39 is provided above hammer shank 35 is affixed to the upper end of this fixing bolt 38.

A second fixing frame 40, which is disposed facing the first fixing frame 39 and with a fixed gap therebetween, and is provided above hammer shank 35, is affixed to the shank rail 33 by means of bolt 41. In addition, hammer movement detection mechanism 30 is placed between these fixing frames 39 and 40. This hammer movement detection mechanism 30 comprises a print base plate 42 which is so fixed as to cover the space between the fixing frames 39 and 40, a distance sensor 43, an LSI 44 which is disposed on the print base plate 42, and an electronic part 45. The distance sensor 43 is inserted into the passage hole 42a which is provided in print base plate 42 facing hammer shank 35 and is affixed to the base plate 42 and is thus disposed facing the upper surface of the hammer shank 35. The LSI 44 and electronic part 45 are inserted into passage holes 42b which are placed in the vicinity of the passage hole 42a and are affixed to the print base plate 42. The hammer movement detection mechanism 30 having this structure is connected electrically to a controller which is not depicted in the diagram.

Next, with reference to FIG. 2, the structure of the hammer movement detection mechanism 30 will be explained. In this hammer movement detection mechanism 30, the shape and attached position of all structural members are so set that the distance T from the uppermost part (in the present example, the upper edge surface of the electronic part 45) to the extended line of the upper surface 34a of the hammer shank fringe 34 is equal to or less than a distance L which is described hereinafter. Here the distance L indicates the distance from the upper projecting end of the repetition regulation screw S2 to the upper surface 34a of the hammer shank fringe 34. Furthermore, in this hammer movement detection mechanism 30, the shape and attached position of all structural members are so established that the distance from the upper surface 35a of the hammer shank 35 to the distance sensor 43 has a fixed value.

The adjustment of these dimensional relationships is accomplished, as shown in FIG. 2, by changing the thickness of a spacer 46 which is disposed between the print base plate 42 and the second fixing frame 40. Here it is also acceptable to use a screw mechanism for fine adjustments in place of this spacer 46. In this manner the disposed position of the hammer movement detection mechanism 30 is above the hammer shank 35, and a position below the pin board 27 is maintained.

Accordingly, in the hammer movement detection apparatus of the first preferred embodiment having such a structure, a light-reflecting type sensor is used as a distance sensor 43 which comprises the hammer movement detection mechanism 30, so that the thickness of this mechanism becomes small and a sufficient space can be maintained between the mechanism and the pin board 27 which is positioned above the mechanism.

As a result there is no need to conduct adjustment processing on the action mechanism 23, the action brackets 31 or the mounting board 21, so that the workability of the attachment and detachment of this action mechanism 23 is increased. Moreover, as a result of this construction, the change in the touch feeling of the keys 22 which existed conventionally does not occur, and a standardized touch feeling can be maintained. Furthermore, as a result of this, it is not necessary to attach any parts to the hammer shank 35, and as a result of this, the ease of assembly increases, as does the ease of production.

Figure 3:
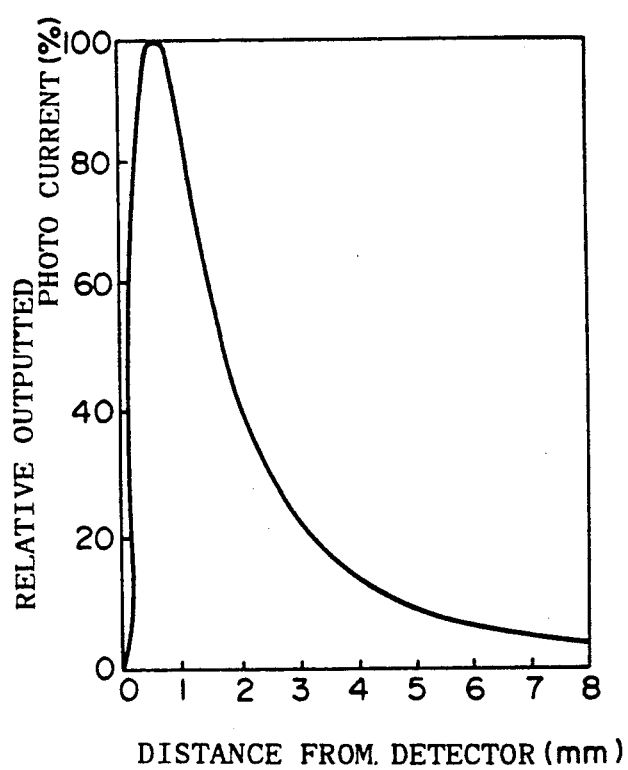
FIG. 3 is for the purpose of explaining the output characteristics of the distance sensor in the same embodiment.

Next the operation of the hammer movement detection mechanism 30 will be explained with reference to FIGS. 3-5. First, when the hammer movement detection mechanism 30 begins operation, light is radiated from distance sensor 43 onto the upper surface 35a of the hammer shank 35. Here, this light is reflected by the upper surface 35 and the reflected light returns to the distance sensor 43. The strength of this reflected light changes based on the distance S (see FIG. 2) between the sensor 43 and the hammer shank 35 and an electrical current is outputted from the distance sensor 43 in correspondence with this change. The output characteristics of this type of distance sensor 43, in other words, the relationship between distance S and the outputted electric current, are shown in FIG. 3.

Figure 4:
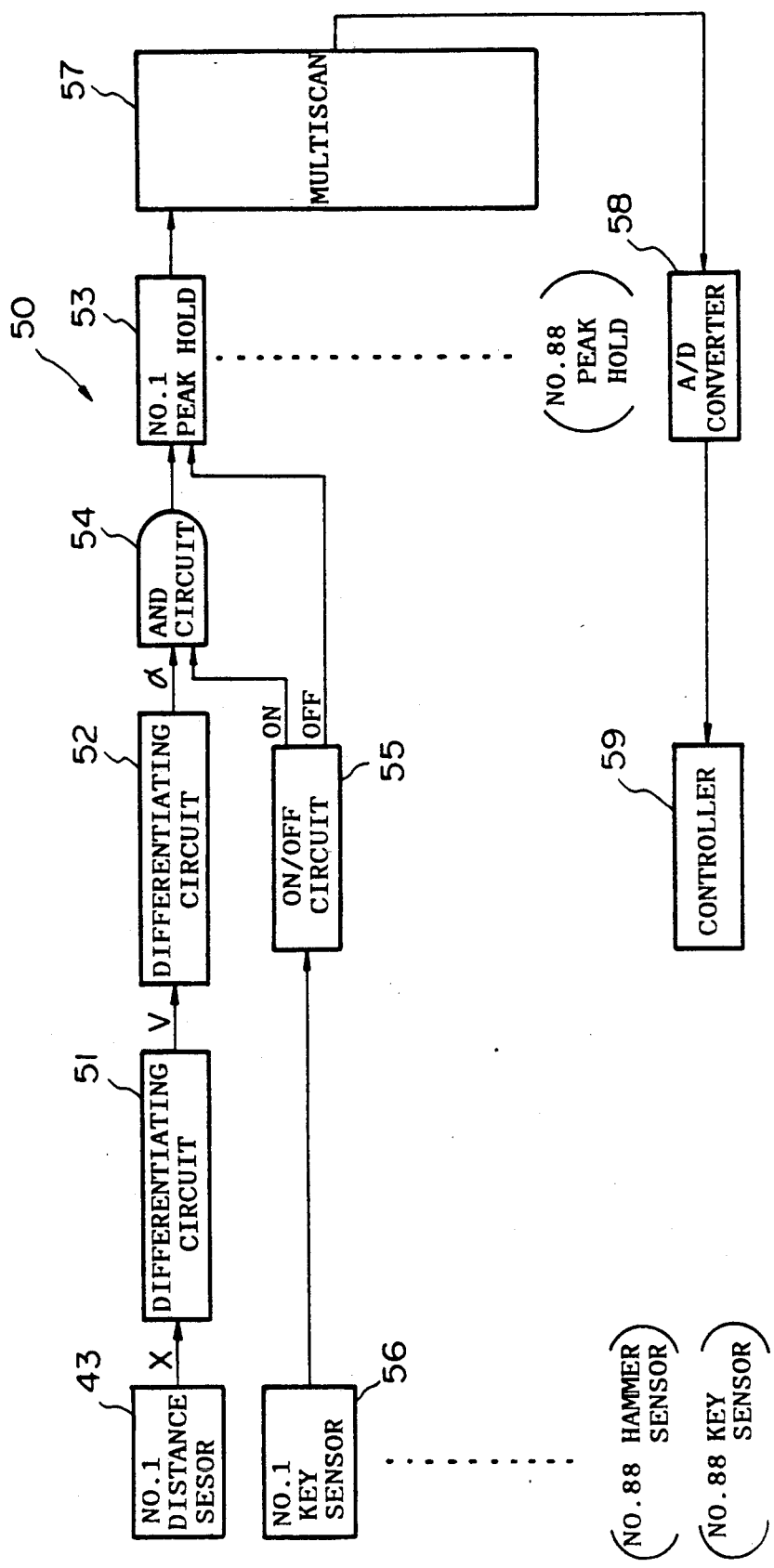
FIG. 4 is a block drawing showing the structure of the calculation mechanism in the same embodiment.

FIG. 4 is a block diagram showing the structure of a calculation mechanism 50 which calculates the displacement velocity and acceleration of hammer 29 based on the output of the distance sensor 43 and the output of a key sensor 56 which detects the depression and release of keys 22. In the diagram, reference numeral 51 indicates a differentiating circuit which differentiates the distance signal X outputted by distance sensor 43 the outputs a velocity signal V. Reference numeral 52 indicates a differentiating circuit which differentiates the velocity signal V which is supplied from the differentiating circuit 51 and outputs an acceleration signal $\alpha$. Reference numeral 53 indicates a peak hold circuit which temporarily maintains the highest value of the acceleration signal $\alpha$ which is outputted from the differentiating circuit 52. Reference numeral 54 indicates an AND circuit which outputs the logical product of the output of differentiating circuit 52 and the output of an ON/OFF circuit 55 which will be explained hereinafter.

ON/OFF circuit 55 generates a signal corresponding to the depression and release of key 22 in response to the signal which is supplied from key sensor 56. In other words the ON/OFF circuit 55 supplies an ON signal to one input terminal of the AND circuit 54 in the case in which key 22 is depressed, and supplies an OFF signal to the peak hold circuit 53 in the case in which key 22 is released. By means of this structure, when key 22 is released and returns to a fixed position, the ON/OFF circuit 55 outputs an OFF signal to the peak hold circuit 53 and the hold value of the circuit 53 is cleared.

These differentiating circuits 51 and 52, peak hold circuit 53, AND circuit 54 and ON/OFF circuit 55 are provided for each key 22 and are connected to a multiscan circuit 57 through the peak hold circuit 53. A controller 59 is connected to this multiscan circuit 57 through the medium of an A/D converter. This controller 59 supplies an activation signal or a corrected activation signal to the solenoids 24 which are provided for each key 22, based on the output signal of the multiscan circuit 57.

In this type of structure, weak, medium strength and strong test strikings of each key 22 are conducted and the digital signals outputted at this time by the A/D converter 58 are stored in the memory mechanism of the controller 59 as correction tables for each key 22. These correction tables are used as standards for the determination of the string striking strength of the hammer of each key 22. The correction tables may also be previously placed in the ROM of each piano.

The calculation mechanism 50 according to the above structure detects the displacement X of the hammer 29 from the distance S between the upper surface 35a of the hammer shank 35 and the distance sensor 43 as stated above when performance begins, and then the velocity V of the hammer is determined in differentiating circuit 51 based on the results of this detection. In addition, in differentiation circuit 52, the acceleration $\alpha$ of the hammer 29 is calculated from the hammer velocity V. This velocity V and acceleration $\alpha$ are corrected in controller 59 by means of a previously obtained correction table, and a corrected hammer velocity is thus obtained.

Figure 5:
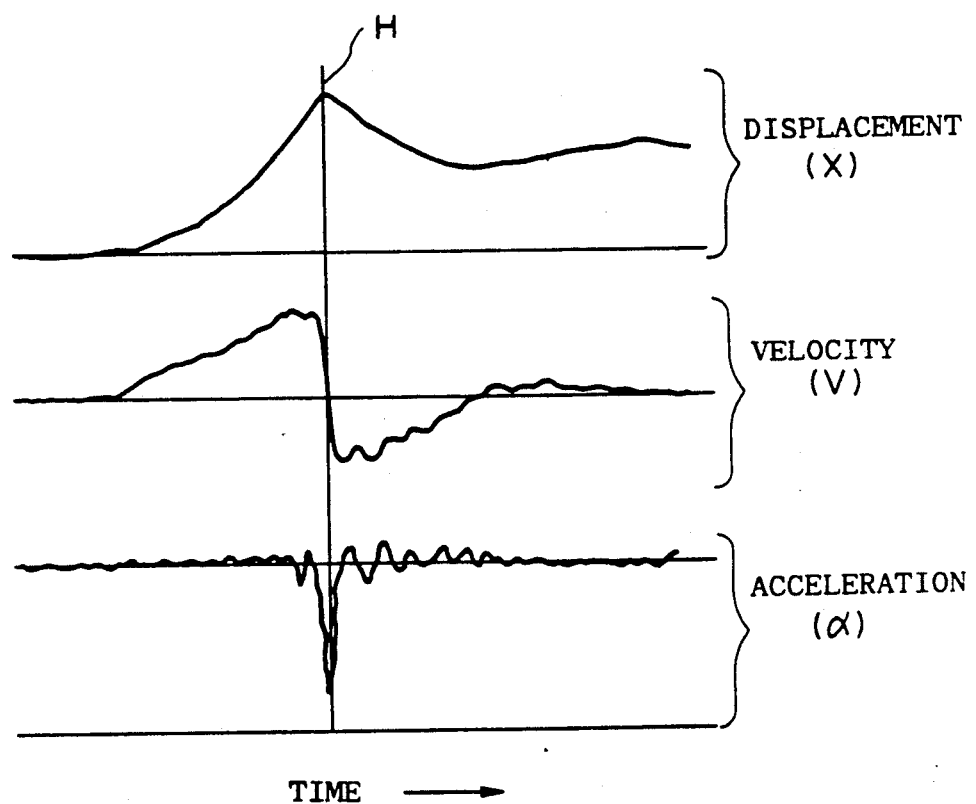
FIG. 5 is for the purpose of explaining the relationship of the displacement, velocity, and acceleration of the hammer in the same embodiment.

In FIG. 5, the relationships between the signals thus detected are shown. In the diagram, the instant at which the string is struck is indicated by the point in time H; this is the point in time at which the displacement X is greatest, at which the velocity V changes from a positive to a negative value, and at which the acceleration $\alpha$ is greatest.

In the case in which acceleration $\alpha$ is measured, AND circuit 54 generates an output by means of the ON signal outputted by the key sensor 56, and by means of this, the greatest value of the acceleration $\alpha$ is held in the peak hold circuit 53. The greatest value of each key 22 is scanned in multiscan circuit 57, and this scanned signal is supplied to the A/D converter and then to controller 59.

The hold operation in peak hold circuit 53 is cleared by means of the OFF signal outputted from key sensor 56 or by means of the signal at the time of the return of key 22 to the hammer stop position.

In this type of hammer movement detection, the change in the mutual positional relationships of the hammer shank 35 and the light-reflecting type distance sensor 43, which mutually move towards and away from each other on the same surface, is directly measured and the displacement of the hammer 29 is thus determined. As a result, it is possible to measure the displacement X in an analog amount, so that it is possible to continuously detect small changes, thus increasing the accuracy of detection.

Second Preferred Embodiment

Figure 6:
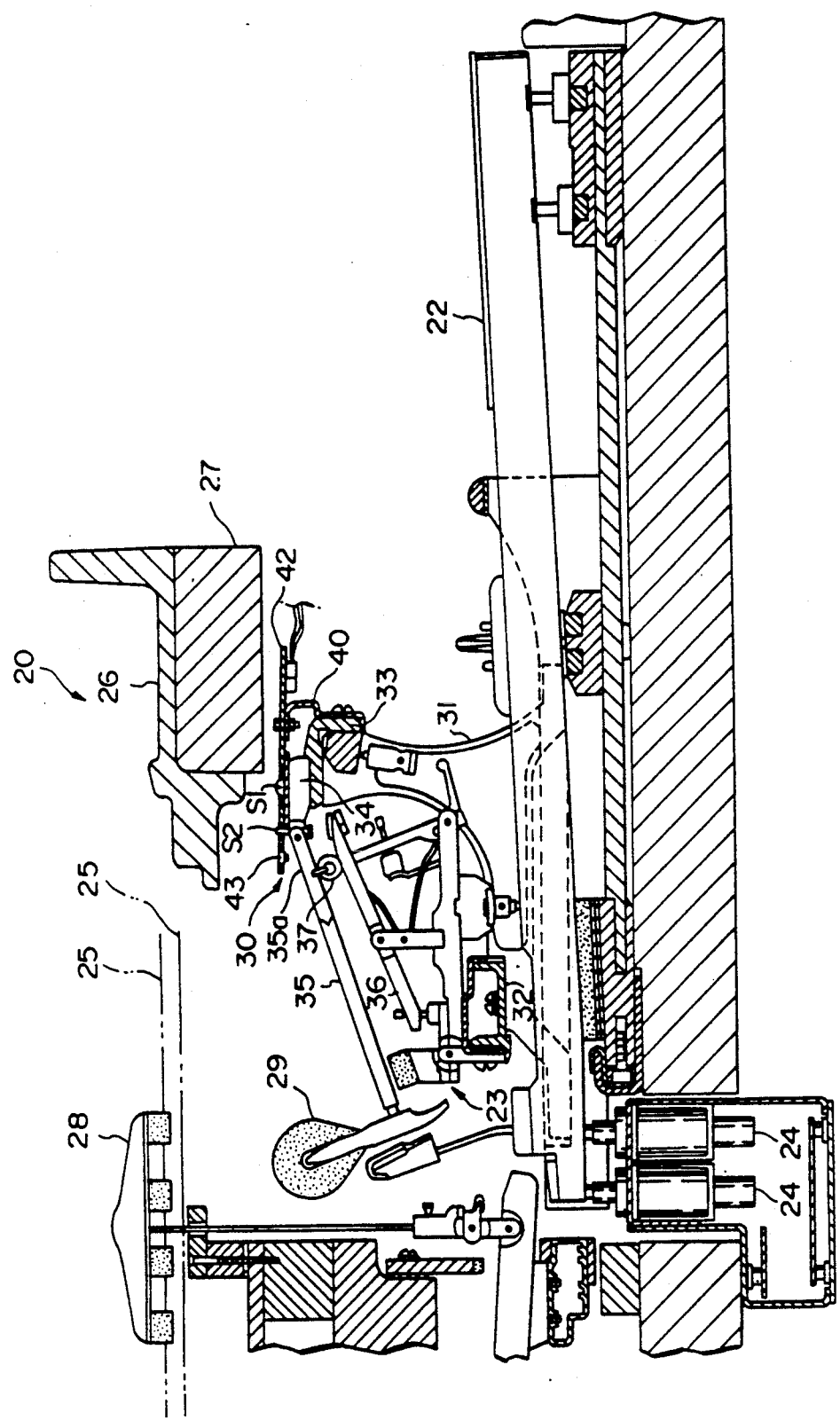
FIG. 6 is a vertical cross-sectional drawing of the main parts of a grand piano to which a second embodiment in accordance with the present invention has been applied.
Figure 7:
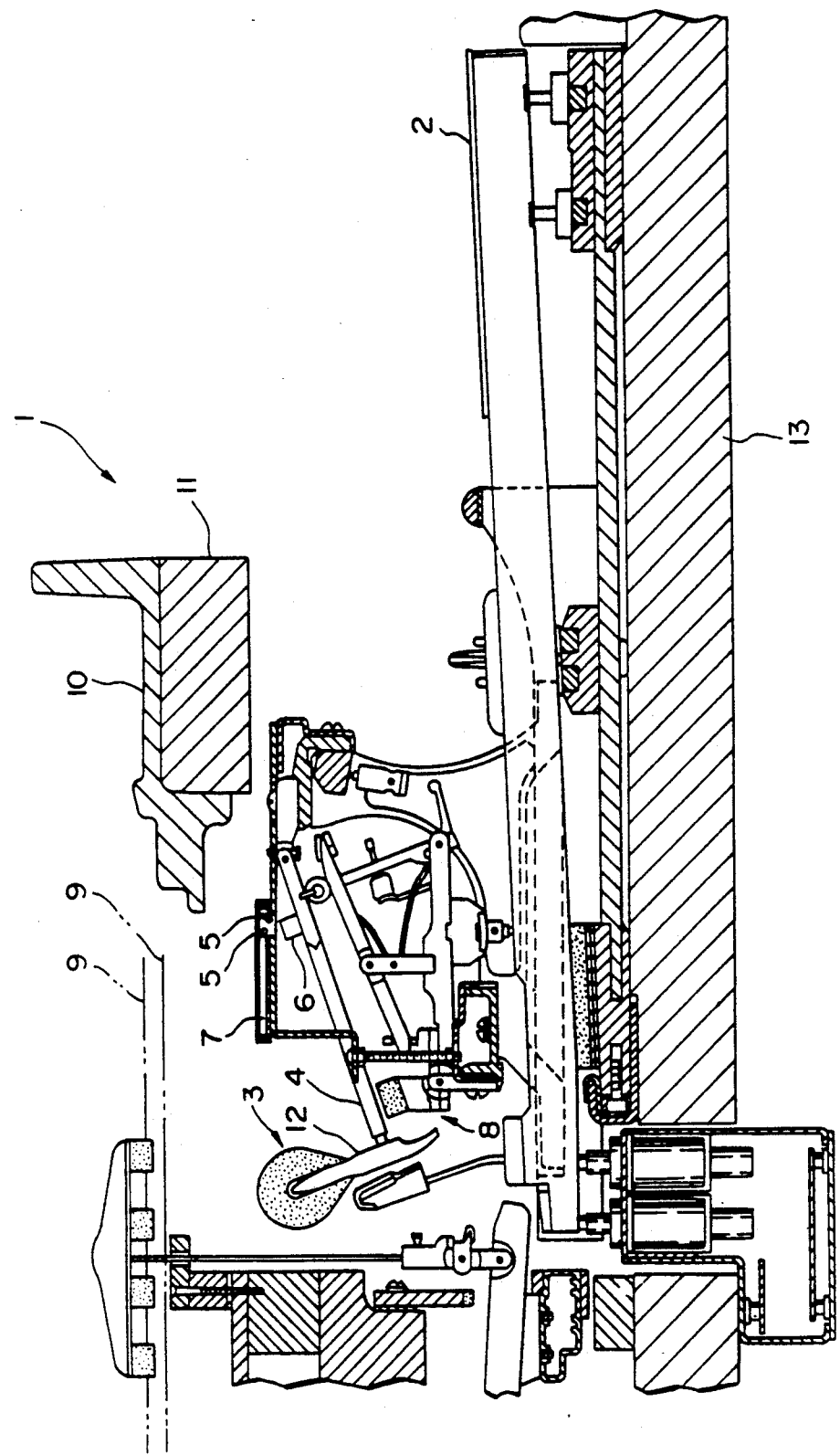
FIG. 7 is a vertical cross-sectional drawing showing the main parts of a conventional grand piano.

The forms and dimensions and the like of each structural member shown in the above first preferred embodiment are merely examples, and a variety of modifications are possible based on the actual requirements. For example, as in the second preferred embodiment shown in FIG. 6, it is possible to extend the print base plate 42 so as to approach the side of the performer. By means of such a structure, it becomes possible to attach large-scale circuit parts to the extended portion of the print base plate 42. Furthermore, it is possible to use a metal plate in place of the print base plate, and thus to unify this structure with that of the second fixing frame 40. By means of this, it is possible to deal effectively with the noise generated by the circuits or outside noise.

What is claimed is:

1. A hammer movement detection apparatus for keyboard musical instruments comprising:

movement detection means for continuously detecting at least a displacement of a hammer shank which moves with a hammer of a keyboard musical instrument based on reflected light from said hammer shank; and a fixed member which is attached to a shank rail which supports a hammer shank in a freely rotatable manner, the fixed member supporting the movement detection means above the hammer shank and below a pin board which is connected to a frame which supports strings which are struck by means of the hammer.

2. A hammer movement detection apparatus in accordance with claim 1, in which the movement detection means comprises:

a first fixing frame which is provided above the hammer shank, a second fixing frame provided at a predetermined distance from the first fixing frame, a print base plate which is so disposed as to cover a gap between the first and second fixing frames and in which a passage hole is provided at a position facing the hammer shank, and detection means, disposed in the passage hole, for detecting displacement of the hammer shank.

3. A hammer movement detection apparatus in accordance with claim 2, in which the detection means includes a photo sensor which generates a signal corresponding to the displacement of the hammer shank.

4. A hammer movement detection apparatus according to claim 1, wherein the movement detection means comprises light emitting means for emitting light to the hammer shank, light receiving means for detecting light reflected from the hammer shank, and photoelectric converting means for converting the detected light into an electric signal.

5. A hammer movement detection apparatus according to claim 4, wherein the light emitting means continuously emits light to the hammer shank, the light receiving means continuously detects light reflected from the hammer shank, and the photoelectric converting means continuously converts the detected light into an electric signal having a varying strength, wherein the strength of the electric signal is proportional to a position of the hammer shank.

6. A hammer movement detection apparatus according to claim 5, wherein the hammer shank moves within a plane of motion, and the light emitting means is positioned so as to continuously emit light to the hammer shank throughout the plane of motion.

7. A hammer movement detection apparatus according to claim 1, wherein the movement detection means is opposingly arranged with the hammer shank and is disposed in a plane of motion of the hammer shank so as to continuously detect the displacement of the hammer shank throughout the plane of motion.

8. A keyboard musical instrument hammer movement detection apparatus comprising:

displacement detection means for continuously detecting the displacement of a hammer shank which moves with a hammer which strikes a string in response to a key depression operation and for generating a displacement signal; and calculation means for generating a hammer velocity signal by differentiating the displacement signal and a hammer acceleration signal obtained by differentiating the hammer velocity signal.

9. A hammer movement detection apparatus in accordance with claim 8, in which the calculation means receives a standard string striking strength for each key, converts displacement signals generated in accordance with this to digital signals, refers to a correction table in which correction data of each key are stored, and corrects hammer velocity signals.

10. A hammer movement detection apparatus according to claim 8, wherein the displacement detection means comprises light emitting means for emitting light to the hammer shank, light receiving means for detecting light reflected from the hammer shank, and photoelectric converting means for converting the detected light into an electric signal.

11. A hammer movement detection apparatus according to claim 10, wherein the light emitting means continuously emits light to the hammer shank, the light receiving means continuously detects light reflected from the hammer shank, and the photoelectric converting means continuously converts the detected light into an electric signal having a varying strength, wherein the strength of the electric signal is proportional to a position of the hammer shank.

12. A hammer movement detection apparatus according to claim 11, wherein the hammer shank moves within a plane of motion, and the light emitting means is positioned so as to continuously emit light to the hammer shank throughout the plane of motion.

13. A hammer movement detection apparatus according to claim 8, wherein the displacement detection means is opposingly arranged with the hammer shank and is disposed in a plane of motion of the hammer shank so as to continuously detect the displacement of the hammer shank throughout the plane of motion.

* * * * *